No. 668,212. Patented Feb. 19, 1901.
N. B. POWTER.
PROCESS OF EXTRACTING FATTY MATTER AND GLUE.
(Application filed Dec. 6, 1899.)
(No Model.)
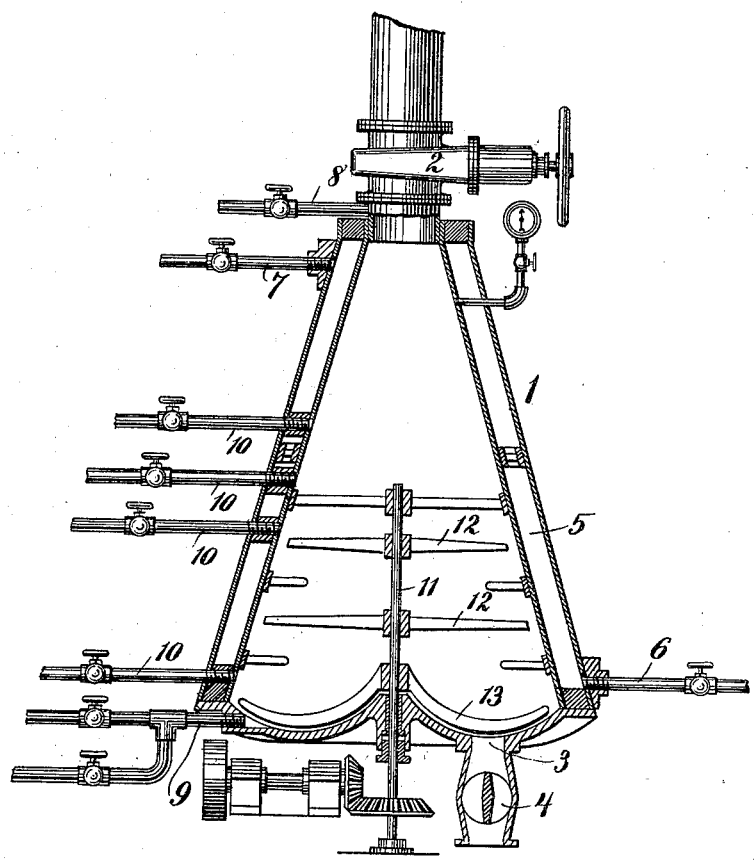
WITNESSES:
INVENTOR
N. B. Powter
BY
ATTORNEYS

UNITED STATES PATENT OFFICE.

NATHANIEL B. POWTER, OF BROOKLYN, NEW YORK, ASSIGNOR TO THE BUCKEYE FISH COMPANY, OF CLEVELAND, OHIO.

PROCESS OF EXTRACTING FATTY MATTER AND GLUE.

SPECIFICATION forming part of Letters Patent No. 668,212, dated February 19, 1901.

Application filed December 6, 1899. Serial No. 739,407. (No specimens.)

*To all whom it may concern:*

Be it known that I, NATHANIEL B. POWTER, a subject of the Queen of Great Britain, residing at Brooklyn, in the county of Kings and State of New York, have invented a new and useful Process of Extracting Oil, Grease, and Glue from Fish Material; and I do hereby declare the following to be a full, clear, and exact description of the invention, such as will enable others skilled in the art to which it appertains to make and use the same.

My invention relates to a process for extracting both oil and grease and glue from fish material, such as fish-meat, fish waste, and the skins, scales, fins, and the like.

My invention consists principally in the use of a glue-restrainer which permits me first to remove the oil and grease and then subsequently to remove the glue.

Heretofore fish-glue has been made principally from those parts of fishes—such as the skin, scales, fins, and the like—which contain but little or no fat, it having been found impracticable hitherto to remove the glue from fish material containing oil or grease, and the processes of extracting oil and grease from such portions of the fish material as contain them have not permitted a subsequent extraction of the glues therefrom. Thus the source of fish-glue has been practically confined to the skin, scales, fins, and the like.

The object of my invention is to make the entire fish-bodies available as a source both of glue and of oil and grease and to separate both the glue and the oil and grease from the fish material and from each other.

The accompanying drawing represents a sectional elevation of one form of apparatus in which my process may be carried out.

In carrying out my process the fish material, which may be either the fish-bodies themselves or any portions thereof, or fish waste, after being well cut up, is placed in a suitable vessel and cooked in water in the presence of a large quantity of salt. I usually employ about five pounds of salt to one hundred pounds of fish material. I find that the salt acts as a glue-restrainer, permitting the grease and oil to be liberated by the cooking, so that they rise to the surface of the fluid in the tank, while the glue is restrained. When all of the oil and grease has been liberated in this manner, it is run off or removed in any other convenient way, and the salt remaining in the vessel is eliminated. This may be done conveniently by a thorough washing of the material remaining in the vessel with water free from alkali. The residue in the vessel is next cooked in the presence of water free from alkali or alkaline compounds, and by this treatment the glue is dissolved in the water. This cooking may be under pressure of about ten pounds per square inch. After substantially all of the glue has been dissolved in this manner the resulting solution is run off and is evaporated to the proper degree of concentration, giving as a resulting product fish-glue.

The oil and grease removed during the earlier portion of the process are collected and purified in any suitable manner. The residue from the process may be converted into a fertilizer.

Instead of employing salt as a glue-restrainer I may employ any other substance capable of performing the same function.

The accompanying drawing represents one form of vessel in which my process may be carried out. The vessel there shown is a digester described and claimed in an application for Letters Patent filed by me on December 6, 1899, Serial No. 739,406.

Reference character 1 designates the vessel as a whole. It is conical in form and is provided at the top with a valve 2, through which the material to be treated may be admitted, and at the bottom with an outlet-opening 3, which may be closed by a valve 4, through which outlet the solid contents of the vessel may be discharged at will. The sides of this vessel are preferably jacketed, the jacket 5 being provided with inlet and outlet connections 6 and 7, through which steam may be circulated for the purpose of heating the contents of the vessel. At the top of the vessel is a grease discharge-outlet 8. At the bottom of the vessel is an inlet 9 for steam or water or both. Other outlets 10 are provided at various points in the sides of the vessel, through which glue and other products may be drawn off from time to time. A suitable charge of the material to be treated may be introduced into the vessel through the valve 2. The desired quantity of salt may also be introduced at the same time and in the same manner. The vessel may then be closed by closing the valve 2, and water may be introduced through the inlet 9, and the mass within the vessel may be cooked by the circulation of steam through the jacket 5. The grease and oil when liberated may be drawn off or floated off through the grease discharge-outlet 8 and the material in the vessel may be washed by passing water free from alkali through it to free it from salt. When the salt has been eliminated, water may be allowed to remain in the vessel, and the contents of the vessel may be again cooked to dissolve the glues by admitting steam to the jacket 5, as before. When the glues are so dissolved, they may be drawn off through the outlets 10.

The vessel 1 may be provided with a shaft 11, carrying stirring-arms 12 and scrapers 13, the stirring-arms being employed to agitate the contents of the vessel and the scrapers being employed to scrape the contents of the vessel into the outlet-opening after the treatment of the charge is completed.

Having thus completely described my invention, what I claim, and desire to secure by Letters Patent, is—

1. The herein-described process of extracting both oil and grease and glue from fish material, which consists in cooking fish material in water in the presence of a glue-restrainer, removing the oil and grease thereby liberated, eliminating the glue-restrainer, cooking the residue in water to dissolve the glue, and removing the solution so formed.

2. The herein-described process of extracting both oil and grease and glue from fish material, which consists in cooking fish material in water at atmospheric pressure, and in the presence of a glue-restrainer, removing the oil and grease liberated, eliminating the glue-restrainer, cooking the residue in water under pressure to dissolve the glue, and removing the solution so formed.

In testimony whereof I affix my signature in the presence of two witnesses.

NATHANIEL B. POWTER.

Witnesses:
HARRY M. MARBLE,
D. HOWARD HAYWOOD.